US011402329B2

(12) United States Patent
Moesslein et al.

(10) Patent No.: US 11,402,329 B2
(45) Date of Patent: Aug. 2, 2022

(54) METHOD FOR IDENTIFYING PLEDGED PROPERTY

(71) Applicant: Polysecure GmbH, Freiburg (DE)

(72) Inventors: Jochen Moesslein, Freiburg (DE); Philip Katus, Freiburg (DE); Daniel Kirchenbauer, Bollschweil (DE); Martin Fahr, Felixsee (DE); Gunther Galfe, Munich (DE); Christian Richter, Petershausen (DE)

(73) Assignee: Polysecure GmbH, Freiburg (DE)

( * ) Notice: Subject to any disclaimer, the term of this patent is extended or adjusted under 35 U.S.C. 154(b) by 377 days.

(21) Appl. No.: 16/606,811

(22) PCT Filed: Apr. 24, 2018

(86) PCT No.: PCT/DE2018/100394
§ 371 (c)(1),
(2) Date: Oct. 21, 2019

(87) PCT Pub. No.: WO2018/196921
PCT Pub. Date: Nov. 1, 2018

(65) Prior Publication Data
US 2020/0378894 A1    Dec. 3, 2020

(30) Foreign Application Priority Data

Apr. 24, 2017  (DE) .......................... 102017108641.2

(51) Int. Cl.
*G01N 21/64* (2006.01)
*G06Q 30/00* (2012.01)

(52) U.S. Cl.
CPC ..... *G01N 21/6408* (2013.01); *G06Q 30/0185* (2013.01)

(58) Field of Classification Search
CPC .................. G01N 21/6408; G06Q 30/0185
See application file for complete search history.

(56) References Cited

U.S. PATENT DOCUMENTS

2006/0117709 A1    6/2006  Niggemann et al.

FOREIGN PATENT DOCUMENTS

| CN | 109415629 A | * | 3/2019 | ............. G07D 7/205 |
|---|---|---|---|---|
| DE | 102009026557 A1 | | 12/2010 | |
| DE | 102011107704 A1 | | 1/2013 | |
| DE | 102017203538 A1 | * | 9/2018 | ........... G07F 7/0609 |
| DE | 102017108641 A1 | * | 10/2018 | ......... G06Q 30/0185 |
| EP | 1235191 A1 | | 8/2002 | |
| EP | 1515280 A2 | | 3/2005 | |
| EP | 2256701 A2 | | 12/2010 | |

OTHER PUBLICATIONS

PCT/DE2018/100394; PCT International Search Report of the International Searching Authority dated Jun. 28, 2018 and its English translation.
PCT/DE2018/100394; PCT International Preliminary Report on Patentability dated Jul. 6, 2018.

* cited by examiner

*Primary Examiner* — David P Porta
*Assistant Examiner* — Fani Polyzos Boosalis
(74) *Attorney, Agent, or Firm* — Renner, Otto, Boisselle & Sklar, LLP

(57) ABSTRACT

The invention relates to a method for identifying pledged property, comprising the steps of: providing an apparatus, comprising: a guide tube in a substantially erect position, comprising an inlet and an outlet; and means for analysing the dynamic luminescence behaviour of a luminescent substance; wherein the means for analysing the dynamic luminescence behaviour of the luminescent substance are disposed so as to analyse the dynamic luminescence behaviour of the luminescent substance in the guide tube, even if said luminescent substance is in motion; introducing a pledged property containing the luminescent substance into the guide tube through the inlet; analysing the dynamic luminescence behaviour of the luminescent substance contained in the pledged property using the means for analysing the dynamic luminescence behaviour of the luminescent substance; and classifying the pledged property according to the result of the analysis.

9 Claims, No Drawings

METHOD FOR IDENTIFYING PLEDGED PROPERTY

The present application is a U.S. National Stage Application based on and claiming benefit and priority under 35 U.S.C. § 371 of International Application No. PCT/DE2018/100394, filed 24 Apr. 2018, which in turn claims benefit of and priority to German Application No. 10 2017 108 641.2 filed 24 Apr. 2017, the entirety of both of which is hereby incorporated herein by reference.

The present invention relates to a method for identifying pledged property such as deposit bottles and other packaged products with a returns deposit.

Deposit bottles are part of a widespread deposit system, in which the customer leaves a deposit for a purchased bottle at a drinks vendor and receives this deposit when the bottle is returned. In this way, drinks bottles can be used multiple times in resource-sparing and energy-efficient fashion. A multiplicity of return machines, in which deposit bottles are automatically detected upon return, are also widespread.

DE 10 2009 026 557 A1 describes an empties reverse vending apparatus and a method for operating same. In this method, an identifiable feature contained in the empties to be sorted is analysed. However, this presupposes the pledged property to be at rest during the analysis.

DE 10 2011 107 704 A1 describes an input unit for an empties reverse vending machine. In the method described therein, a specific positioning of a marker that is intended to allow the identification of the pledged property provided is required for the analysis.

EP 1 235 191 B1 describes an appliance for returning rigid or flexible containers for receiving liquid or solid products by means of an identification of certain parameters.

The methods of the prior art for identifying pledged property are disadvantageous in multiple ways. Firstly, the identification features previously used to identify deposit bottles and other empties are not secure enough; i.e., they are easy to counterfeit. Therefore, significant economic damage could arise as a result of deposit fraud, in particular as a result of the high monetary values of the deposit for empties that is conventional in Germany. Moreover, previously used identification features can easily become unreadable by way of material ageing (light, temperature, chemical action, etc.).

Likewise, known apparatuses used for identifying pledged property often require mechanical transport apparatuses, for example for transporting the pledged property to the analysis apparatus (e.g., a conveyor belt) or for orienting the identification feature towards the analysis apparatus (e.g., rotating a bottle). Disadvantages arising herefrom include the user often having to insert the object into the transport device in a certain way (lying down, standing up, with a certain orientation, etc.), great technical outlay being required, the transport device not being suitable for all object dimensions simultaneously and a corresponding method therefore being slow, susceptible to wear and sensitive to dirtying. Finally, the methods of the prior art do not allow pledged property of very different dimensions to be identified using only a single apparatus.

It is therefore the object of the present invention to provide a method for identifying pledged property, said method overcoming the disadvantages of the prior art, in particular providing increased security against counterfeiting of the pledged property and facilitating a reliable identification within a simple process. Likewise, the method should render it possible to be able to identify objects of different dimensions in a simple manner, wherein the objects may be in motion in order to facilitate a higher throughput of pledged property.

These objects are achieved by a method for identifying pledged property, comprising the following steps: step a) providing an apparatus, comprising a guide tube in a substantially erect position, comprising an inlet and an outlet; and means for analysing the dynamic luminescence behaviour of a luminescent substance; wherein the means for analysing the dynamic luminescence behaviour of the luminescent substance are disposed so as to analyse the dynamic luminescence behaviour of the luminescent substance in the guide tube; step b) introducing a pledged property containing the luminescent substance into the guide tube through the inlet; step c) analysing the dynamic luminescence behaviour of the luminescent substance contained in the pledged property while the pledged property moves through the guide tube, using the means for analysing the dynamic luminescence behaviour of the luminescent substance; and step d) classifying the pledged property according to the result of the analysis.

The invention relates to a method for identifying pledged property. Pledged property within the meaning of the present application should be understood to mean packaging that is suitable for the recycling, either as such or the substance thereof. The pledged property provided according to the invention can be empties, in particular, i.e., containers that should be returned to the vendor following the consumption of the contents. In particular, provision can be made for the pledged property to be foodstuff containers. Thus, provision can be made for the pledged property to be a bottle, in particular a glass bottle, a plastic bottle, etc.

The term "contain", as used in the sense of the luminescent substance being contained in the pledged property, should be interpreted broadly within the meaning of the present invention. In particular, this term should also comprise options in which the luminescent substance is contained in a carrier that is subsequently applied to the pledged property, in which the luminescent substance is applied directly to the pledged property, for instance by pressure, etc. A suitable carrier in this context can be in particular a label, a sticker or an attachment option of a similar nature.

The apparatus used in the method according to the invention comprises a guide tube. The latter is disposed substantially in an erect position. This means that the guide tube can be disposed perpendicular to the Earth's surface in order thus to allow the pledged property to fall within the apparatus, through the guide tube from the inlet to the outlet. The term fall implies that the movement of the pledged property can be implemented purely under the influence of gravity, i.e., in particular, without further mechanical means, for instance conveyor belts, mechanically moved rollers, etc. The clarification that the guide tube should be "substantially" in an erect position should identify that an oblique arrangement of the guide tube, i.e., an inclination of the guide tube with respect to the Earth's surface, may also be provided for as long as the movement of the pledged property purely under the influence of gravity is ensured. In this case, the pledged property slides along a surface of the guide tube from the inlet to the outlet.

There are no restrictions on the guide tube in terms of its form, in particular the geometric form of its diameter. In particular, round, oval, rectangular or polygonal diameters of the guide tube can be provided for as long as the latter is configured in such a way that the pledged property can be guided without problems through the guide tube.

The guide tube may contain apparatuses that simplify sliding of the pledged property or prevent blocking by pledged property, e.g., vibrators, shakers, etc.

In particular, provision can be made for the guide tube to have a diameter greater than that of the pledged property at all points.

Classifying the pledged property may comprise making a distinction between authentic and non-authentic pledged property and/or dividing the pledged property into classes and/or assessing the pledged property. In particular, classifying may contain: distinguishing between authentic and non-authentic pledged property, dividing the pledged property into classes, on the basis of the classes, assessing the pledged property (for ascertaining the value of the deposit) and/or sorting the pledged property. Acceptance and non-acceptance are downstream options, likewise based on the classification.

Further, the dynamic luminescence behaviour preferably is the luminescence emission behaviour over time.

Likewise, resolving the luminescence emission in time is preferred.

Preferably, provision is made for a decay constant to be determined for one or more emission wavelengths or emission wavelength ranges.

Likewise, integrating the luminescence emission over a fixed period of time is preferred.

Likewise, provision can be made for a spectral integration of the luminescence emission.

Likewise, ascertaining parameters such as the decay constant from the measured luminescence behaviour and comparing said parameters to intended values stored in a database is preferred.

Furthermore, the luminescent substance is preferably selected from the group of fluorescent materials that emit electromagnetic radiation following electromagnetic radiation being excited, the wavelength of said electromagnetic radiation being greater than and/or less than and/or equal to the excitation wavelength.

Likewise, a method that determines the dynamic luminescence properties in UV and/or VIS and/or IR is preferred.

The method according to the invention serves, in particular, to identify and/or authenticate pledged property.

Moreover, the means for analysing the dynamic luminescence behaviour of the luminescent substance are preferably disposed around the guide tube in ring-shaped fashion. The term "ring-shaped" should be interpreted broadly here and, in particular, comprises any arrangement suitable for detecting the emission or the emissions from all solid angles around the pledged property. In particular, the term ring-shaped should not be construed as restrictive in respect of the precise geometric design. Thus, a ring-shaped arrangement may also include a rectangular arrangement or a different natured polygonal arrangement of the means. The ring-shaped arrangement facilitates an orientation-independent analysis of the dynamic luminescence behaviour of the luminescent substance contained in the pledged property. What is exploited here is that the luminescence propagates in isotropic fashion, i.e., in all spatial directions. There is no need to align the marker on account of the ring-shaped arrangement of the analysing means in this embodiment, simplifying the process.

In particular, provision can be made for the means for analysing the dynamic luminescence behaviour of the luminescent substance to be a detector apparatus. A plurality of detectors can be arranged in ring-shaped fashion in the detector apparatus. Likewise, the detector apparatus can be formed by a detector with a ring-shaped embodiment. The latter is advantageous as there is no need to synchronize a plurality of detectors, substantially simplifying the control.

Likewise, the dynamic luminescence behaviour can be measured at a distance from the surface of the pledged property in this embodiment, and so the guide tube can be designed for deposit bottles with different diameter and pledged property of different dimensions. The distance between detection device and pledged property can be 0-50 cm, 0-10 cm, 0-5 cm, 0-1 cm. As a result, it is possible to identify deposit bottles and pledged property of different dimensions.

Likewise, provision can be made for the method to comprise a further step (e) following step d): sorting the correspondingly classified pledged property.

Moreover, provision is made for the method according to the invention to comprise a further step f) following step d): returning or keeping the correspondingly classified pledged property.

In order to configure these embodiments, provision can be made, in particular, for apparatuses that divide the pledged property into different fractions depending on the classification to be adjacent to the outlet.

Sorting can be based on the classification, which is based on the luminescence behaviour and/or on further markers, such as, e.g., barcode/QR code/symbol/article number etc., and/or the shape of the pledged property (e.g. bottle shape) and/or material properties. Further detectors can be provided for verifying material properties (e.g., metal detectors).

In particular, provision can be made for the apparatus to be an empties reverse vending machine.

In this embodiment, provision can be made, in particular, for the empties reverse vending machine to comprise further usual generic means, for instance input apparatuses, output apparatuses for outputting a voucher, etc.

In contrast to absolute measurements in the prior art, relative measurements of optical properties, such as, e.g., the analysis of the behaviour of luminescence emission over time, were surprisingly found to be insensitive to disturbance variables, such as, e.g., additive dirt or overlaid dirt. An identification of pledged property using relative luminescence properties is therefore not influenced by the inherent substantially optical properties of the pledged property to be identified.

The luminescence properties can be based on luminescent substances from the group of fluorescent materials. Luminescence is understood to mean the emission of electromagnetic radiation after the input of energy. Here, the energy input is preferably brought about by way of photons; consequently, the observed luminescence is photoluminescence. Photoluminescence can occur in UV and/or VIS and/or IR. The wavelength of the emitted electromagnetic radiation can be greater than and/or less than and/or equal to the excitation wavelength.

By way of example, materials according to the patent application DE 10 2014 105 846 A1 can be used as fluorescent materials.

Increased protection against forgery can be obtained by exploiting dynamic luminescence properties. This applies, in particular, in relation to methods in which only the intensity or wavelength of a certain fluorescent marker is measured.

One embodiment is distinguished by virtue of a luminescence emission behaviour over time being determined for identifying the pledged property. This should be understood to mean that the emission of the luminescence is detected over a set period of time using measurement technology following the end of the excitation. The detection by way of measurement technology can be carried out once or a number of times in succession in the time interval following the excitation of the luminescence. Here, a set dead time can be provided between the end of the excitation and the start of the first measurement. The duration of the individual measurements and hence the time during which the absolute luminescence intensity is integrated can be identical or can differ. The duration of an individual measurement is 1 µs-10 ms, preferably 10 µs-1 ms, more preferably 50 µs-500 µs. This method opens up a number of options:

Following the excitation, the luminescence intensity for an emission wavelength or a wavelength range can be determined multiple times after set time intervals. Intensity curves over time can be formed from the absolute intensities obtained. This can also be performed for a plurality of emission wavelengths or wavelength ranges. Likewise, it is possible to form intensity ratios between different emission wavelengths or emission wavelength ranges.

Determining the decay constant for one or more emission wavelengths or wavelength ranges is also preferred. The decay constant is understood to mean the time interval during which the initial intensity of the emission drops to 1/e of the original.

A further embodiment is distinguished in that the intensity of the luminescence emission is integrated over the entire spectrum. This is advantageous if weak emission signals have to be evaluated.

Various detectors such as monochrome cameras, colour cameras, photomultipliers, spectrometers, photocells, photodiodes, phototransistors can be used, either on their own or in combination, for detecting the luminescence properties. Optical filters such as, e.g., long pass/short pass/bandpass filters can be used in the detection devices. In another embodiment, the analysis means can be, in particular, means for detecting the emissions, which, in particular, may also comprise light-guiding elements. In this embodiment, the emission is focused onto a sensor such that the sensor need not detect the emission directly.

For the purposes of exciting the luminescence by the means for analysing the dynamic luminescence behaviour of the luminescent substance, use can be made of broadband and/or narrowband sources, either on their own or in combination, such as, e.g., lasers, laser diodes, light-emitting diodes (LEDs), xenon lamps, halogen lamps. The excitation sources can be activated individually or activated simultaneously or sequentially in various combinations. Optical filters such as long pass/short pass/bandpass filters can be used in the excitation devices.

Moreover, it is preferable for the means for exciting the luminescence to be arranged around the guide tube in ring-shaped fashion. This facilitates an excitation of the luminescence independently of the alignment of the luminescent marker contained in the pledged property. There is no need to align the marker in this embodiment, as a result of which the method process is simplified.

The means for exciting and detecting the luminescence can be disposed in the same plane or offset along the guide tube. The arrangement in the same plane is advantageous in that the pledged property is already level with the detectors at the moment of excitation, and so the maximum intensity of the luminescence emission can be detected.

Moreover, it is possible to dispose the means for analysing the dynamic luminescence behaviour of the luminescent substance and the means for exciting the luminescence multiple times along the guide tube such that a plurality of excitation and measurement positions are formed along the guide tube. As a result, different excitation/measurement combinations can be used during the passage of the pledged property. Sequence and number of the excitation and measurement means are combinable as desired.

A mapping between the measured luminescence properties on the one hand and the marked pledged property on the other hand must be established in order to identify the pledged property in accordance with the presented methods.

Here, intended luminescence properties are preferably stored in a database. One or more luminescence properties can be determined by experimental determination for each pledged property containing one or more fluorescent markers. When performing the identification, the measured luminescence properties are compared to the intended luminescence properties previously stored in the database and an identification is facilitated in this manner.

The methods according to the invention can be used to identify and/or sort pledged property.

Below, the subject matter of the application should be explained on the basis of a specific exemplary embodiment, with this exemplary embodiment merely serving to elucidate the scope of protection and not restrict the latter.

EXEMPLARY EMBODIMENT

Use was made of an apparatus in which a guide tube with an internal diameter of 144.6 mm was used. The guide tube was disposed vertically with respect to the ground. An excitation source in the form of 8 LEDs with an emission maximum at 950 nm and a radiant power of approximately 16 W was used as means for analysing the dynamic luminescence behaviour. Excitation pulses with a pulse duration of 20 to 300 µs were produced by means of the excitation source. An excitation pause of 60 µs was observed between the pulses. Further, IR photo sensors of the BTW 34 FS type were contained as further analysing means. The intensity of the luminescence emission was measured in the excitation pauses. The luminous intensity was measured in a plurality of time intervals and the decay constant was determined therefrom.

The apparatus described above was used in exemplary fashion for identifying two different pledged property. The pledged property differed (in respect of the luminescent substance contained therein) in respect of the excitation maximum, the emission maximum and the decay constants. Decay constants with the values of 270 µs and 330 µs were used. After introducing the respective pledged property into the guide tube, the pledged property dropped downwards under the influence of gravity. While the pledged property passed the analysis apparatus specified in the text above, the luminescent substance was excited by the irradiation source, the luminescence emission was detected and the decay constant of the luminescent marker contained was determined in the manner specified above. Here, both the excitation and the measurement occurred during the movement of the pledged property in the guide tube. The pledged property was classified on the basis of the ascertained decay constant, wherein the decay constant of 270 µs served the assignment of a deposit value to the pledged property while the decay constant of 330 µs served a corresponding non-assignment.

The features of the invention disclosed in the description above and in the claims can be essential both on their own and in any desired combination for the implementation of the invention in its various embodiments.

The invention claimed is:

1. Method for identifying pledged property, comprising the steps of:

a) providing an apparatus, comprising:
  aa) a guide tube in a substantially erect position, comprising an inlet and an outlet; and
  bb) means for analysing dynamic luminescence behaviour of a luminescent substance;
  wherein the means for analysing dynamic luminescence behaviour of the luminescent substance are disposed so as to analyse the dynamic luminescence behaviour of the luminescent substance in the guide tube, even if said luminescent substance is in motion;
b) introducing a pledged property containing the luminescent substance into the guide tube through the inlet;
c) analysing the dynamic luminescence behaviour of the luminescent substance contained in the pledged property using the means for analysing dynamic luminescence behaviour of the luminescent substance; and
d) classifying the pledged property according to the result of the analysis.

2. Method according to claim 1, wherein the dynamic luminescence behaviour is the luminescence emission behaviour over time.

3. Method according to claim 2, wherein a decay constant is determined for one or more emission wavelengths.

4. Method according to claim 1, wherein the luminescent substance is selected from the group of fluorescent materials that emit electromagnetic radiation following electromagnetic excitation, the wavelength of said electromagnetic radiation being greater than and/or less than and/or equal to the excitation wavelength.

5. Method according to claim 1, wherein the means for analysing dynamic luminescence behaviour of the luminescent substance are disposed around the guide tube in ring-shaped fashion.

6. Method according to claim 1, wherein the method comprises a further step e) following step d):
  e) sorting the correspondingly classified pledged property.

7. Method according to claim 1, comprising a further step f) following step d):
  f) returning or keeping the correspondingly classified pledged property.

8. Method according to claim 1, wherein the pledged property is a deposit bottle.

9. Method according to claim 1, wherein the apparatus is an empties reverse vending machine.

* * * * *